United States Patent [19]

Paley

[11] 4,063,960
[45] Dec. 20, 1977

[54] TREATMENT OF SUGAR CANE

[76] Inventor: Lewis A. Paley, 614 Adams St., Aurora, Ill. 60005

[21] Appl. No.: 217,725

[22] Filed: May 2, 1972

[51] Int. Cl.$^2$ .......................... C13D 1/00; C13D 1/02; C13D 3/12; C13F 1/00

[52] U.S. Cl. .......................................... 127/42; 127/2; 127/9; 127/11; 127/43; 127/48; 127/54; 127/55; 127/61

[58] Field of Search ................. 127/2, 9–10, 127/37, 42; 260/412, 412.8

[56] References Cited

U.S. PATENT DOCUMENTS

| 57,465 | 8/1866 | Bell | 127/42 |
|---|---|---|---|
| 287,902 | 11/1883 | Blandin | 127/2 |
| 1,309,999 | 7/1919 | Bunker | 260/412 |
| 2,450,586 | 10/1948 | Dunning | 127/37 |
| 2,522,797 | 9/1950 | Paley | 127/46 R |
| 3,436,344 | 4/1969 | Canning | 127/9 X |

OTHER PUBLICATIONS

"Cane Sugar Handbook," G. L. Spencer, ed., eighth edition, pp. 69–74, John Wiley & Sons, 1945.

Primary Examiner—Sidney Marantz

[57] ABSTRACT

Method of treating cut sugar cane, which comprises depositing the cane on a conveyor, spraying steam on the cane to melt and remove wax and field dirt on the surface of the cane, and removing the melted wax and condensed steam below said conveyor. Sugar cane juice, produced by subjecting the steamed cane to roller action, is treated with active carbon to yield a clarified juice. The clarified juice is evaporated to form direct white sugar and edible molasses. The wax is collected, purified and molded into cakes. Adding an alkaline material to the expressed juice precipitates out soaps.

4 Claims, 3 Drawing Figures

TREATMENT OF SUGAR CANE

This invention relates to the treatment of sugar cane. It further relates to the manufacture of quality sugar products from the sugar cane.

With the current practice of manufacturing white cane sugar, the fresh juice is cold limed and then heated to boiling which melts the wax in the juice and puts it into solution to ruin the juice. Some of the 53 impurities in the juice are then settled out from the juice in a hot clarifier and the brown clarified juice is then evaporated to a black syrup. This syrup is then further evaporated in the vacuum pan, sent to the crystallizer and then to the centrifuge to separate the brown raw sugar from the blackstrap molasses. The raw sugar is then sent to a distant refinery to be redissolved and reworked to remove wax and color and produce white refined sugar of commerce. Field dirt in the juice is cooked up in the juice and causes bad side reactions. The cane wax in suspension, which is rubbed off from the outside of the cane stalks into the juice is the root of all evil and is what makes raw sugar "raw." The excess lime plus cooking, scales up the heating surfaces in the heaters and evaporators and forces the sugar factory into an expensive weekly cleanout and shut down to clean out the scale. The entire process is highly inefficient, expensive and cumbersome but the mistakes have been made for over a century so that the hot process is firmly entrenched.

I have discovered that all the 53 impurities in the fresh juice are in suspension and may be quantitatively removed from the juice at room temperature. In the fresh juice, there is a sharp cleavage between sugar juice and impurities and if this cleavage is not destroyed by heating, bacterial action or violent stirring, clarification of the juice to water white condition is easy if you know how. The water white juice may then be concentrated to a syrup and then further concentrated to form direct white sugar, edible molasses or liquid sugar. No raw sugar or black strap molasses are produced and no refining of raw sugar is required at a saving of 3 cents per pound of white sugar. The black strap molasses is entirely eliminated and this contains 30% sucrose and 30% invert sugar which is an almost total loss and said molasses is ⅓ of the total tonnage produced by a sugar factory. The total saving of my process is in excess of 5 cents per pound of white sugar which is composed of the following savings: elimination of blackstrap molasses, up to 25% increase of sugar, avoiding inversion of sucrose in the hot clarifiers, losses on refining of raw sugar, loss of byproducts, cost of clean outs, the lime bill saved, and loss of sugar by freezing, hurricanes and drought on the cane (crop insurance). The cane wax I recover is valuable for polishes and records, but is easily destroyed by the adverse conditions of the present hot process.

I have also discovered that if the wax is steam cleaned from the outside of the cane stalks before crushing, the heat put into the juice by the steam is not objectionable from the clarification standpoint. I have also discovered that most of my process can be used for the purification of polluted water, such as river water, sewage plant effluent water, industrial waste water and even raw sewage.

An object of the invention therefore is to provide a method of processing sugar cane which produces the end products direct white sugar and edible molasses with the natural maple flavor.

Another object of the invention is to provide a cane treating method in which the cane stalks are subjected to steam to simultaneously melt and remove the cane wax and field dirt so as to prevent the wax and dirt from entering the juice to cause complications in clarification.

Another object of the invention is to recover the cane wax as a valuable byproduct without being destroyed.

Another object of the invention is to greatly shorten and reduce the cost of the present hot process.

Another object of the invention is to provide crop insurance for sugar cane so that sour juice from cane damaged by freezing, hurricanes or drought can be readily processed to produce direct white sugar and edible molasses.

Another object of the invention is to sterilize the cane stalks before processing to reduce bacterial action in the juice.

Another object of the invention is to clarify cane juice to water white condition prior to concentration.

Another object of the invention is to produce direct white sugar, active carbon, laundry soap, edible molasses, board, paper, furfural, cane wax, glucose, liquid sugar and gypsum molded products from sugar cane.

Another object of the invention is to produce edible glucose from bagasse so that almost all of the cane stalks are used for valuable human food.

Another object of the invention is to provide suitable apparatus for carrying out my method.

Another object of the invention is to provide a cascade juice clarification system in which the impurities in the juice are progressively removed from the juice while the juice flows by gravity in a cascade from tank to tank of the clarification system. Another object of the invention is to provide a method of making gypsum molded products from sugar cane.

Another object of the invention is to use condensate water from steaming the cane for producing more steam.

Another object of the invention is to provide an apparatus for the recovery of wax from steaming of the cane.

Another object of the invention is to provide a calcining apparatus for calcining and regenerating the mud for recycling.

Another object of the invention is to provide a process of clarifying cane juice which will require the least change in present sugar factory equipment.

Another object of the invention is to provide a process of purifying polluted water and raw sewage for reuse.

Another object of the invention is to provide a combination weir and filtering means in a settling tank.

A still further object of the invention is to provide a natural cane wax for use as polishes and records; also to improve cane methods, products and apparatus in other respects hereinafter specified and claimed.

In the drawing forming a part of this specification,

Figure 1:
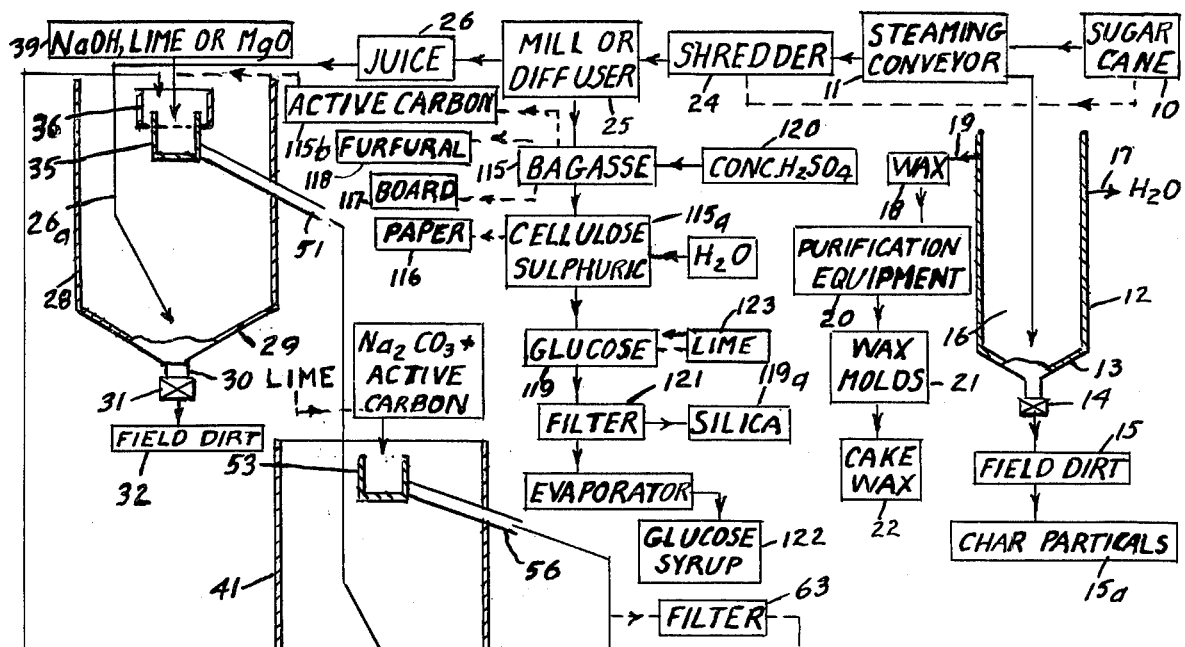
FIG. 1 is a flow sheet of my cane treating method with parts of the apparatus shown in sectional elevation.

Referring to the drawing by numerals, the sugar cane stalks 10 are usually cut in the field by manual labor or by harvesting machines, wilted and burned in windrows and brought into the factory by trucks or train. The cut stalks are deposited by means of cranes onto a steaming conveyor 11 which is composed of a wire net extending between drive chains and sprockets. Live steam pipes having terminal nozzles spray live steam onto the cane stalks from above and below this conveyor to melt and remove the film of cane wax which exists on the outside of the stalks. The steam also has the effect of sterilizing the stalks and killing the bacteria normally existing in the juice, so as to improve the keeping qualities of the juice. The steaming also removes the field dirt from the cane. This field dirt may constitute 26–50% of the juice volume without cane cleaning depending on how wet the weather is. It is customary to burn the leaves from the cane while the cane lies in windrows in the field, and pieces of charred leaves existing on the stalks will be removed by the steaming and may later be recovered for use in juice purification.

The liquid mixture from the steam cane cleaning operation falls into a settling tank 12 having a frusto-conical bottom 13 and a bottom outlet valve 14 for discharging the settled field dirt 15 and charred leaf particles $15_a$. The charred particles $15_a$ may be separated from the field dirt by floatation and are used for juice purification or as a filler for plastic molding compounds 113. The water of condensation 16 partly fills the tank 12 to the level of a discharge pipe 19. The melted cane wax 18 rises as a layer to the top of the water 16 and is drawn off through a discharge pipe 17 and conveyed into a purification equipment 20 where foreign impurities, such as fatty acids, are removed. The resulting pure wax 18, which has not been destroyed as at present, is run into molds 21 where the wax cools down to form cakes 22 of wax. This wax is suitable for various types of polishes, such as auto, furniture, boot, floor, etc., and is also suitable for molding playing records. In the present hot process this wax is degraded and forms raw sugar and black strap molasses. The melted wax may be purified by mixing powdered active carbon with it and then filtering.

From the steam cleaning operation the clean cane goes to a shredder 24 where the clean stalks are shredded into pieces to expose the juice bearing stalk interior and to aid in the removal of the juice by mill 25, or diffuser, or both. The fatty acids also occur in the interior of the stalk while the tough rind prevents the loss of sugar by steaming prior to shredding the stalks. The juice 26 removed by mill-diffuser 25 is warm with a temperature of 120°–190° F. Since the wax has been previously removed by the steam cleaning, it is no longer in the field of action to interfere with juice clarification by melting and producing raw sugar. The steam cleaning of the cane is considered very desirable but optional. The heating effect of the steam on the cane stalks and juice will be an advantage where the juice is to be extracted from the cane by diffusion since extraction at an elevated temperature of 120°–190° F. is desirable. Since no wax is present at this point, the destruction of the wax at a high temperature and a darkening of the juice is avoided. Juice made by the ordinary diffusion equipment is very hard to decolorize with active carbon due to destruction of the wax by the heat and interaction with other impurities.

The juice 26 is introduced by pipe $26_a$ near the bottom of a tank 28 having a frusto-conical bottom 29 and bottom mud outlet pipe 30 with valve 31. The little remaining field dirt 32 settles out and is drawn off by opening valve 31 to be hauled to the field. If the dirt 32 contains much wax, the wax may be recovered with the solvent heptane to recover the wax before hauling the dirt to the field. The char particles in the dirt 32 may be recovered from the dirt by water floatation to be used for juice clarification. Water 16 may be used for raising steam in a boiler or it may be used for masceration water in the mill or diffuser.

The partly clarified juice in tank 28 rises upwardly and overflows into a rectangular box-like weir 35 positioned near the top of tank 28. Skimmers 36 are positioned near the top upper edge of weir 35 in spaced relation thereto, to prevent any floating bagacillo or other particles from entering the weir 35. The floating matter removed by skimmers 36 may be scraped from the upper surface of the juice manually or by mechanically driven moving skimmer blades. Various precipitating reagents may be mixed with the juice in weir 35. These reagents may be lime slurry 39 to a pH of 7–8.5, and powdered active carbon slurry 50 or a mixture of the two. MgO may also be used instead of or mixed with lime. NaOH 39 or $Na_2CO_3$ may be used as the sole precipitating agent to combine with the fatty acids in the juice to form laundry soap 39 which is settled out in a tank 41 and converted to cake or powder form for laundry purposes. Calcium or magnesium soaps may be used as an ingredient in lubricating greases. If the steam cleaning of the cane is not used, wax 46 may appear in the soaps 39. If it is desired to extract the wax from the soaps 39 or field mud, the active carbon slurry $115_b$ should not be introduced into weir 35 since it forms a complex chemical compound with the wax and the wax is insoluble in the common solvents for cane wax, such as heptane, hexane etc.

Tank 41 is provided with a frusto-conical bottom 42, outlet pipe 43 and valve 44 for the removal of the soaps or other settled impurities from the juice. Cane wax 46 may be extracted by heptane from the laundry soap. If the active carbon is introduced into the weir 35, the impurity mud from valve 44 may be dried in a drier 48 and introduced into a calciner 49 for calcination at 500°–600° C. to form a mixture of quick lime which is converted to hydrated lime and active carbon 50 for recycling and juice purification by introduction into weir 35. A pipe 51 connected to the bottom of weir 35 conveys the juice containing the reagents through the wall of tank 41 where the impurity precipitate settles out to be withdrawn from valve 44. Tank 41 is also provided with a rectangular weir 53 near its top for receiving settled juice overflowing into it. The settled juice in tank 41 overflows into weir 53 and additional reagents may be added to the weir 53 which include $Na_2CO_3$ for precipitating excess lime from the juice so as to produce a direct white sugar 55 which has a very low ash content. Active carbon slurry may also be added to the weir 53 to remove the last of the impurities from the juice and produce a water white juice. A pipe 56 extends from the bottom of weir 53 through the wall of tank 41 to a point near the bottom of a settling tank 57 having a frustoconical bottom 58, outlet pipe 59 and valve 60 for discharging the mud from tank 41. A plurality of rectangular box-like weir 61 is positioned near the top of tank 57. The settled juice from tank 57 overflows into weirs 61 and a pipe 62 extends from the bottom of weir 61 through the wall of tank 57 to a filter 63. The weirs 61 preferably have lower walls of plastic filtering mesh to filter any sediment from the juice as the juice enters the weir. The cake formed may be washed off the weir walls from time to time as needed by a stream of clarified juice. The filter 63 may be of the Simco or rotary drum vacuum type to handle large volumes of juice, and remove the last trace of sediment in the juice to form water white juice 64. In some cases where there is little or no sediment in the juice, the filter 63 may be omitted and filtration may be avoided until after the juice is evaporated in evaporator 65 or concentrated to a syrup 68 by reverse osmosis equipment. The water white juice 64 may be diluted with about equal parts of water 66 or more, carbonated $66_a$ and bottled to form a soft drink beverage 67. Artificial flavoring and coloring material may be added to juice 64 before carbonating and bottling. The added $CO_2$ tends to precipitate any residual lime in the juice which may be settled out before bottling. The syrup 68 is preferably received in a mixer 69 where powdered active carbon 70 is added to the syrup to remove any trace of color remaining. The syrup is not hot filtered in filter 72 to remove the active carbon and any trace of sediment formed during evaporation, to form water white syrup 73. The syrup 73 is sent to the vacuum pan 74 where the syrup is further evaporated to 70°-80° Brix which is sent to crystallizer 75 where it is slowly stirred to induce crystallization of sucrose, forming massecuite 76 composed of a mixture of direct white sugar 59 and edible molasses 77. Levulose $77_a$ may be produced from edible molasses 77 by fractional crystallization to produce dextrose crystals and levulose syrup $77_a$. Seed crystals may be used in crystallizer 75 to induce crystallization.

This mixture shows a sharp cleavage between sucrose and molasses and the sucrose settles quickly to the bottom of the container leaving the light amber edible molasses above. The molasses may be partly removed from the sucrose by decantation and the balance can be removed by transferring the sucrose to a centrifuge 78 where the balance of the molasses is spun from the sucrose. A light washing with warm water in centrifuge 78 then produces glistening white direct white sugar 55 which is dried in drier 79 and bagged in bagging machine 80 for market. A screening operation is preferably used for the dried direct white sugar to remove any lumps. Liquid sugar 81 may be obtained from vacuum pan 74 to be sold to large industrial users in tank car lots. This liquid sugar will contain all the natural invert sugar in the juice 26 and would be low in cost because it avoids all crystallizing, centrifuging and bagging operations. The sucrose in the liquid sugar should be inverted to invert sugar by about 50% to prevent crystallization in the container. It would be optional and would be the sole product of the sugar factory. The edible molasses may be purified by chlorination for bleaching, and by the use of active carbon and filtration to make a water white molasses. This water white molasses may be dried in spray or other drier 83 to produce dry invert sugar 84 to be sold to large industrial users in bag form.

The mud 85 delivered from the bottom of tanks 41 and 57 is filtered on filter 86 of the rotary drum type and then dried in drier 48, calcined in calciner 49 to produce nearly pure active carbon 50 or a mixture of active carbon and hydrated lime slurry which is recycled in part. The calciner 49 comprises a tube 87 set on an inclination such as 20° so that gravity constantly urges the lime and active carbon mixture downwardly in tube 87 packed full about a ribbon conveyor 88 which is rotatably motor driven in tube 87. The dried mud from drier 48 is introduced into the calciner hopper 89 which has a tight fitting removable cover 91. The dried mud is carried up hill by the ribbon conveyor 88 and is mixed as it is conveyed. An electric jacket 92 is positioned around the tube 87 and is controlled by thermostat 93 to maintain a temperature of about 450°-550° C of the calcined mud delivered to the upper end of tube 87. The calcined mud mixture is delivered into a hopper 95 having an inclined lower end 96 and door 97. The door 97 is hinged at the top and provided with lever 98 and adjustable slide weight 99 for urging door 97 to closed position. When the weight of the calcined mixture increases, it opens the door 97 and drops the hot mixture charge into a tank 101 of water 102 to quench the active carbon and to convert the quick lime formed in the calciner 49 into hydrated lime slurry 50 with active carbon which is recycled to purify additional juice 26.

The vapors given off from tube 87 by the calcination and dry distillation of the mud, are withdrawn under low vacuum through a pipe 105 through a water or air condenser 106 by application of vacuum to a valved vacuum pipe 107, on vacuum receiving tank 108 having a sloping bottom 109. A valved vent pipe 110 is provided on the top of tank 108 and a valved discharge pipe 111 is provided on tank 108 near the bottom 109 of tank 108. Solvent 112 is drawn off the tank 108 as desired and sold as a valuable byproduct or gasoline substitute as it is a highly volatile liquid resembling gasoline and can be used as a gasoline substitute or for other purposes. The mud from drier 48 may also be used for making plastic molding compound by grinding it with 10-25% phenol formaldehyde A stage resin, zinc stearate mold release and wood saw dust, to form plastic molding compound 113. On molding by compression or by special injection delayed heating molding to form various molded products having a high mechanical and impact strength and electrical insulation value.

The calciner 89 is provided with an air intake pipe $89_a$ having a control valve $89_b$ so that about ½% of air may be drawn into the tube 87 under vacuum to activate the carbon as it is mixed by the conveyor 88 and calcined. The air also causes the reaction to be exothermic as a slight amount of carbon is burned by the oxygen in the air. Once the reaction is started by the heating jacket 92, it is no longer necessary to supply external heat as all the heat is supplied internally. This is important from a cost of operation standpoint as the two reagents lime and active carbon are obtained for nothing. The carbon also acts as a reducing agent to cause the lime to be changed to quick lime at the low temperature of 500° C. Since the lime and active carbon are calcined as a mixture, no separation of the components is needed or desired, and the resulting clarification reaction is strictly coprecipitation of the various impurities in the juice so that one precipitate helps to carry down another precipitate in a very fast settling coprecipitate which settles in 10-20 minutes of time which is much faster than the conventional hot precipitation which takes about 3 hours. This tends to greatly increase the capacity of the regular equipment in the settling operation.

Bagasse may be mixed with the mud in calciner 49 if desired in order to increase the carbon content of the resulting active carbon-lime mix. Bagasse may be used exclusively in the calciner in order to prepare a pure active carbon without lime, as for sale to other industries as a valuable byproduct. The bagasse is an abundant source of high grade active carbon useful in all industries. Other vegetable matter may be put through the calciner in order to prepare active carbon. The valve $89_b$ is connected by an electric wire to the thermostat 93. The thermostat thus acts to vary the valve setting and amount of air to maintain the internal heat constant and maintain a uniform calcination temperature for the mix.

The bagasse 115 left after the removal of the juice from the cane by milling or diffusion consists of a high percentage of cellulose which may be converted into high grade active carbon 115$_b$ in calciner 49 by calcination. The bagasse may also be converted into paper 116 or board 117 including press board, by conventional methods. The bagasse 115 may also be converted into furfural 118 by destructive distillation. Of special interest is the conversion of bagasse 118 into glucose 119, preferably in table syrup form. This conversion is accomplished by mixing concentrated sulphuric acid 120 with the bagasse to form cellulose sulphuric acid 115$_a$. After standing 5 to 8 hours, the mixture is diluted with 1 to 4 parts of water and then boiled. These reactions produce glucose 119 quantitatively and the glucose solution may be filtered in the presence of active carbon to form a water white glucose solution which may be filtered in filter 121 to form a sulphuric acid solution of glucose 119. The acid may be recovered by reverse osmosis if desired, evaporated and recycled. If desired, the glucose solution 119 may be neutralized with lime 123 to form a precipitate CaSO$_4$123 which may be formed into various building products, such as board, tile, etc. The glucose syrup 122 is sold in bottled form as a table syrup. It may be mixed with edible molasses 77 to form a maple flavored table syrup. The glucose 119 may also be fermented and distilled by conventional methods to form ethyl alcohol used in commerce and in liquors. The glucose 119, liquid sugar 81 and edible molasses 77 may be used as ingredients in mixed alcoholic drinks. The cane stalks contain an ash high in silica. The silica residue 119$_a$ left after conversion of the cellulose to glucose may be used as a filler for plastics 113.

All process steps and products may be considered as optional and may be used depending on market conditions. In the flow sheet, dotted lines indicate optional procedures.

It is obvious from the drawing that the settling drums 28, 41 and 57 are arranged in a cascade so that the impurities in the juice are removed in steps from the juice, as the juice decends in the cascade from tank to tank. Thus field dirt, laundry soap and mud are progressively removed from the juice in an orderly and progressive manner, to produce water white juice 64. The tanks 28, 41, and 57 are positioned at steadily decreasing elevations to produce a natural flow of the juice under gravity to accomplish the clarification of the juice.

Figure 3:
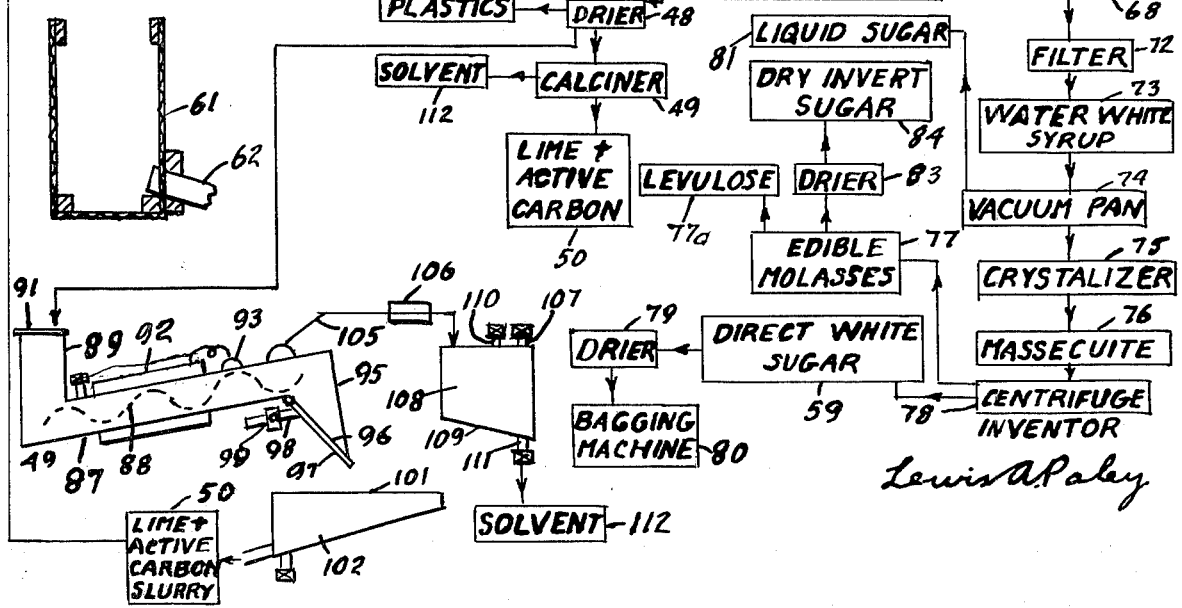
FIG. 3 is a sectional elevation of my filtering weir.

As an example of my preferred method, sugar cane 10 is steam cleaned on conveyor 11 to form cake wax 22 and field dirt 15 plus char particles 15$_a$. The cleaned cane then goes to a shredder 24 and to mill or diffuser 25, where the juice 26 is removed from the cane. The juice 26 is conveyed by pipe 26$_a$ to the bottom of tank 28 where the field mud 32 and char particles 15$_a$ settle and are removed from tank 28 through valve 31. The partly clarified juice rises upwardly to overflow into weir 35. A mixture of lime 38 and active carbon 115$_b$ is added as a slurry to the juice in weir 35 to precipitate all impurities in the juice. The purified juice goes through pipe 51 to the bottom of a settling tank 41 where the precipitated impurities settle to the bottom and are withdrawn through valve 44. The clarified and water white juice rises upwardly in tank 41 and overflows into weir 53. The juice passes into weir 53 and outwardly through pipe 56. Na$_2$CO$_3$ and active carbon slurry 54 is run into weir 53 to precipitate any excess of lime to adsorb any remaining color, and to raise the pH of the juice to 7-9.5 for killing any bacteria. The juice is delivered through pipe 56 to the bottom of settling tank 57 and any precipitate settled out in said tank 41 is drawn from said tank through valve 60. The juice rises in tank 57 and overflows into weirs 61 through filter cloth on the sides of said weir (FIG. 3). This cloth removes any trace of sediment to produce water white juice 64. The juice 64 is evaporated to syrup in evaporator 65, goes to mixer 69 where active carbon 70 is added, and then goes to a filter 72 and vacuum pan 74 and to cyrstallizer 75 and centrifuge 78 to form direct white sugar 84 and edible molasses 77.

Much of the above described process may be used in the purification of polluted water, such as river water, sewage plant effluent water, industrial waster water, and even raw sewage. The steps incident and peculiar to the treatment of sugar juice would be omitted such as 11, 24, 17, 25, 54 and 68. The polluted water is easily purified to drinking water quality by the use of lime and active carbon. The impurities removed from the polluted water are as follows;

Organic matter, Most of the hardness, Algae, Phosphates, Taste, Color, Odor, Industrial poisons, Bacteria, Sediment, Iron, Mercury, Turbidity, Detergents.

The polluted water is preferably chlorinated at the start of the process to kill bacteria, and the excess chlorine is removed by the active carbon. The resulting purified water is potable and can be used for domestic water supply in cities. In the purification of raw sewage, my process will replace conventional activated sludge digestion, Imhoff tanks, and trickling filters, so it is revolutionary. The lime and active carbon mixture will be regenerated by calcinationa as above described and recycled indefinitely. In the claims to follow, the word juice should include polluted water in its meaning where applicable.

Figure 2:
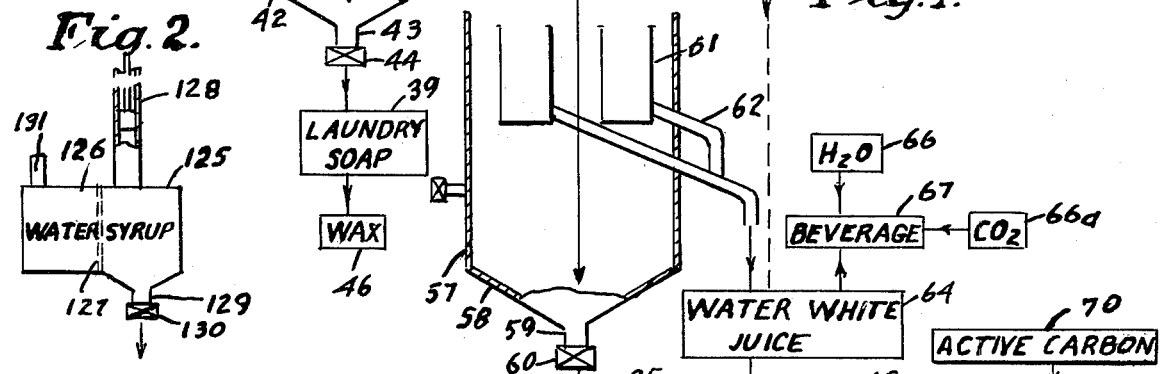
FIG. 2 is a fragmentary elevation of a reverse osmosis apparatus for concentrating the water white juice to a syrup without the use of evaporation.

In FIG. 2 is illustrated my reverse osmosis equipment for concentrating the water white juice to a syrup of about 65° Brix without the use of evaporation. A high pressure chamber 125 is separated from a low pressure chamber by a permeable membrane 127. A high pressure pump 128 is connected to chamber 125 so as to deliver water white juice into said chamber 125 under 500-1500 p.s.i. to force the water through the membrane 127 which retains the syrup in chamber 125 to be drawn from said chamber 125 through outlet pipe 129 having a valve 130. The syrup will be further concentrated in vacuum pan 74 to a massecuite 76. The water flows out from chamber 126 at atmospheric pressure through pipe 131.

I would state in conclusion that while the examples illustrated and described constitute practical embodiments of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. The method of treating cut sugar cane, which comprises depositing said cane on a conveyor, spraying steam on said cane to melt and remove wax and field dirt on the surface of said cane, and removing said melted wax and condensed steam below said conveyor after said steam condenses and passes through said conveyor and treating said steamed cane to produce direct white sugar and edible molasses.

2. The method as described in claim 1 characterized in that said steamed cane is subjected to roller action to squeeze juice from said cane, adding active carbon to said juice to remove impurities, removing the spent carbon from said juice to form clarified juice, and evaporating said clarified juice to form direct white sugar and edible molasses.

3. The method as described in claim 2 characterized in that an alkaline material is added to said juice to precipitate soaps, and removing said soaps from said juice.

4. The method as described in claim 1 characterized in that said wax is purified and molded into cakes.

* * * * *